United States Patent
Takai

(10) Patent No.: US 6,381,701 B1
(45) Date of Patent: Apr. 30, 2002

(54) METHOD AND DEVICE FOR TIME/DATE ADJUSTMENT FOR COMPUTER

(75) Inventor: Kazuhito Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,464

(22) Filed: Apr. 28, 1999

(30) Foreign Application Priority Data

Apr. 28, 1998 (JP) .......................................... 10-118849

(51) Int. Cl.$^7$ ................................................ G06F 1/14
(52) U.S. Cl. .......................................... 713/400; 368/47
(58) Field of Search ................................ 713/400–601; 368/46–61

(56) References Cited

U.S. PATENT DOCUMENTS

| | | | | | |
|---|---|---|---|---|---|
| 4,014,166 A | * | 3/1977 | Cateora et al. | ................ | 368/28 |
| 4,287,597 A | * | 9/1981 | Paynter et al. | ............... | 455/12.1 |
| 5,319,374 A | * | 6/1994 | Desai et al. | ................. | 342/387 |
| 5,402,424 A | * | 3/1995 | Kou | ............................ | 370/324 |
| 5,542,035 A | * | 7/1996 | Kikinis et al. | ............... | 713/323 |

FOREIGN PATENT DOCUMENTS

| | | | | |
|---|---|---|---|---|
| JP | 59-165116 | 9/1984 | | |
| JP | 63-33494 | 3/1988 | | |
| JP | 4-344719 | 12/1992 | | |
| JP | 5-119170 | 5/1993 | | |
| JP | 5-333170 | 12/1993 | | |
| JP | 405333170 A | * 12/1993 | ............ | G04G/5/00 |
| JP | 6-258460 | 9/1994 | | |
| JP | 7-55965 | 3/1995 | | |
| JP | 7-128465 | 5/1995 | | |
| JP | 7-281787 | 10/1995 | | |
| JP | 407281787 A | * 10/1995 | ............. | G06F/1/14 |
| JP | 8-101289 | 4/1996 | | |
| JP | 8-316858 | 11/1996 | | |
| JP | 408289010 A | * 11/1996 | ............ | H04M/3/00 |
| JP | 9-61561 | 3/1997 | | |
| JP | 9-106496 | 4/1997 | | |
| JP | 9-119992 | 5/1997 | | |

* cited by examiner

*Primary Examiner*—Sumati Lefkowitz
(74) *Attorney, Agent, or Firm*—Foley & Lardner

(57) ABSTRACT

A time/data adjustment device automatically synchronizes the time in a computer to the time information contained in signals from a broadcast satellite even when the computer is turned off. A broadcast station outputs video data and audio data of a broadcast program, electronic program guide (EPG) and time/date information from a satellite antennae. A geostationary satellite relays the signals to a earth station. A satellite receiving subsystem of the computer, using a stream separator, separates video data, audio data and other data, the EPG and date information are sent to the computer through a bus controller. In the computer, a device driver software acts as the interface between the subsystem and an operating system of the computer to renew the date data in the application software, and also inputs the date data in the real-time clock circuit.

9 Claims, 5 Drawing Sheets

METHOD AND DEVICE FOR TIME/DATE ADJUSTMENT FOR COMPUTER

BACKGROUND OF THE INVENTION

1. Field of the Invention

The present invention relates to a time/date adjustment device for a computer equipped with a satellite broadcast receiving subsystem.

2. Description of the Related Art

Conventionally, a known system of time/date adjustment device is based on a technique of inputting time information received from a satellite into a computer, as disclosed in a Japanese Patent Application, First Publication Hei 7-55965. This method is predicated on having an earth-orbiting satellite which periodically outputs information including global standard times, and a computer receiving this information computes a time difference according to the receiver coordinates relative to the orbiting satellite, and adjusts the time stored inside the computer.

Another technique is suggested in a Japanese Patent Application, First Publication Hei 5-119170, which is based on receiving a time signal output from a broadcasting satellite, and correcting it for the propagation time difference of the signal at the receiving location. In this method, delay time difference from the standard time, caused by the propagation differences corresponding to the latitude/longitude of the receiving location, is stored in the computer, and the delay time is corrected with reference to the time signal contained in the received satellite signal and a trigger signal output by the receiving computer.

Japanese Patent Application, First Publication Hei 8-316858 discloses a technique for correcting the time based on the standard time data in the teletext data. Japanese Patent Application, First Publication Hei 9-061561 discloses a technique for correcting the time based on the information included in the television signal. Japanese Patent Application, First Publication Hei 9-119992 discloses a device which reproduces a clock pulse and a time data from the signal transmitted from the GPS satellite and outputs an accurate time data. Japanese Patent Application, First Publication Hei 59-165116 discloses a timer in a computer for correcting the time based on the error which is measured in advance.

However, the technology disclosed in the Japanese Patent Application, First Publication Hei 7-55965 has the following problems. First, it is predicated on the use of an orbiting satellite generating the global standard time signals, but such a satellite does not exist in reality. Further, satellites used in broadcasting are geostationary satellites, and are intended for use in relaying programming schedules and time information from terrestrially based broadcasting stations, and beaming the information back to the earth surface. Thus, the signals do not contain any information that can be used to determine the coordinates of the receiving location.

Second, depending on the time information output from the satellite, the satellite time cannot be synchronized with time signals sent from the earth, and therefore, cannot be synchronized with earth-based broadcast programs. Thirdly, because date information is not output by the satellite, the earth-based computer cannot receive date information. Fourth, the receiving computer cannot be powered simply by setting the computer time to the satellite time, therefore, if a time-activated signal reception is required, satellite information must be received while the power to the computer is turned on.

In the technology disclosed in the Japanese Patent Application, First Publication Hei 5-119970, trigger signals (=time signal) are pre-determined depending on geographic locations, and to correct the time, the trigger signal is delayed slightly depending on the longitude of a receiving location. For a program whose broadcast is synchronized to the correct time, a gap is created between the program and the correct time, so that the correction method is not preferable in consideration of timer starting. Therefore, for the case of synchronizing actual broadcasting to the correct time, this technique is meaningless.

SUMMARY OF THE INVENTION

It is an object of the present invention to provide a time/date adjustment device for automatically synchronizing the time data in a computer receiving a satellite broadcast program with the time/date information transmitted by electrical wave from satellite.

The object has been achieved in a time/date adjustment device for adjusting time/date data of a computer in a computer system, equipped with a satellite broadcast receiving subsystem, comprising: a time/date receiving section for receiving broadcast time/date information transmitted from a satellite; a decoding section for decoding the broadcast time/date information; and a write section for writing decoded time/date data to a real-time clock circuit backed by a battery that manages time data in the computer.

It is preferable that the decoding section is a stream separation device, provided in the satellite broadcast receiving subsystem, for separating time/date data from multi-plexed signals, received from the satellite, comprised by video data, audio data and other signals. Also, the write section may serve as an interface means between satellite broadcast receiving subsystem and an operating system, and represents a driver software operated by the computer.

It is preferable that the computer is provided with: a timer-activation time register for storing time data to enable time-activating the computer even when a main power source for the computer is off; a comparison section for comparing time/date data in the real-time clock circuit with time data stored in the timer-activation time register, even when the main power source for the computer is off; and a power request section for outputting a power request signal to power the computer based on a comparison result, when the main power source for the computer is not on.

A first advantage of the time/date adjustment device is that the current time being managed in the application software for satellite broadcast reception, and the time data which had been stored in the computer are now unified, so that there is no need for using a time-based application software to adjust the computer time data. The reason is that the time data in the computer is automatically synchronized to the time/date information received in the computer from a broadcast satellite. A second advantage is that when the software for satellite broadcast reception is to be timer-driven by the computer, there is no need to constantly receive time/data information from the satellite. This is because the time/date information received from the satellite is synchronized with the time/date data in the real-time clock in the computer is back up by a battery so that, even when the computer power is off, the time is functioning correctly.

DESCRIPTION OF THE PREFERRED EMBODIMENTS

Preferred embodiments will be presented in the following.

The time/date adjustment device for a computer is designed to be used with a computer equipped with a satellite broadcast receiving subsystem and is comprised by: a receiving section for receiving broadcasting-station-based time/date information received from a satellite; a decoding section for decoding the time/date information; and a recording section to write the decoded time/date information to a real-time clock circuit backed up by a battery, which manages the time in the computer.

Figure 1:
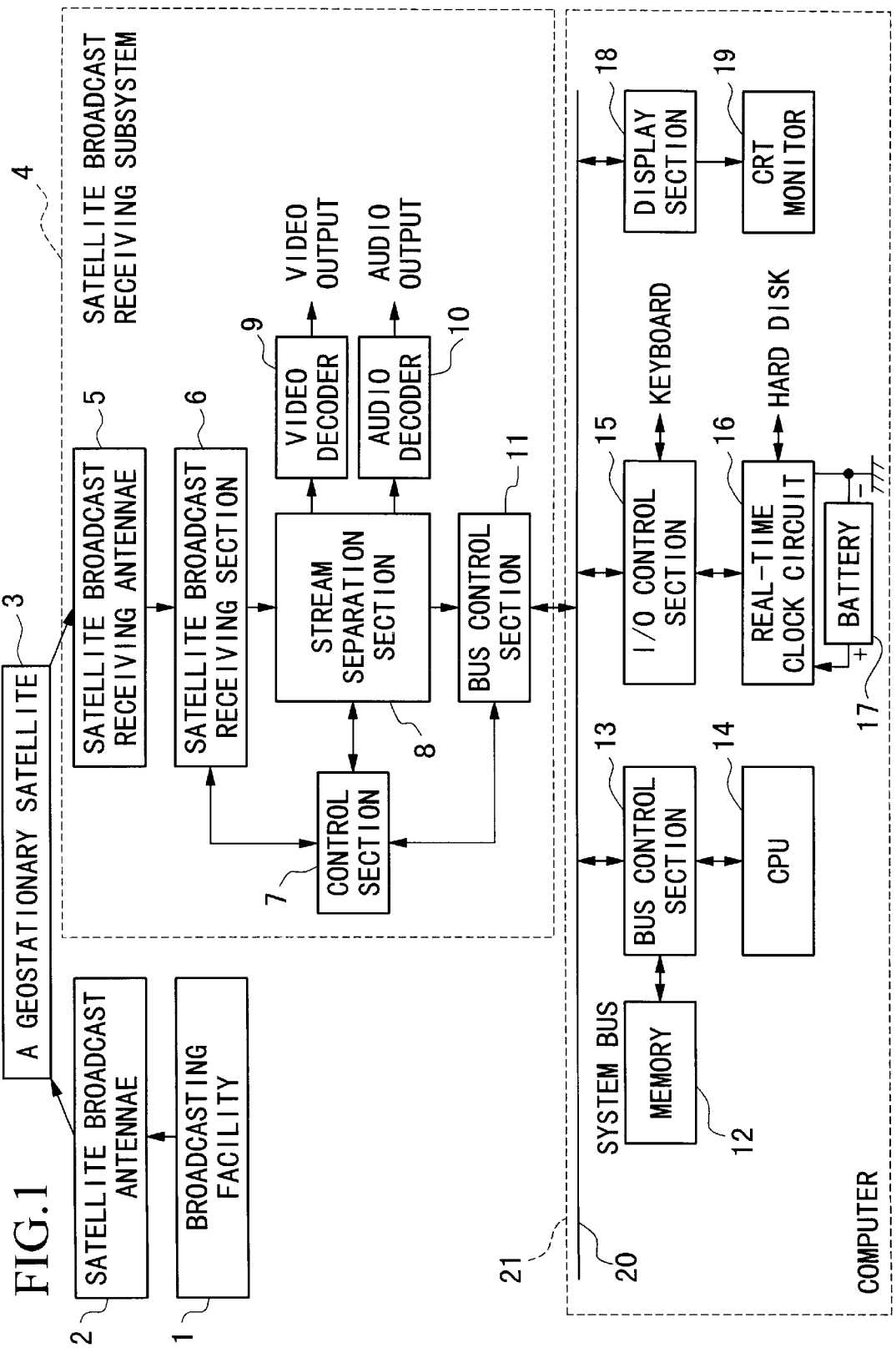
FIG. 1 is a block diagram of the overall components associated with an embodiment of the time/date adjustment device of the present invention.

The embodiment will be presented with reference to the drawings. FIG. 1 shows a block diagram of an embodiment of the time/date adjustment system, in which the signals transmitted from a broadcasting facility 1 are transmitted from the satellite broadcast antennae 2 as electrical wave, and via a geostationary satellite 3, the signals containing the time/date information are received in a satellite broadcast receiving subsystem 4, and synchronize the time/date data in the computer 20.

Satellite broadcast receiving subsystem 4 is comprised by: a satellite broadcast receiving antennae 5 for receiving signals relayed from the satellite 3; satellite broadcast receiving section 6 for tuning, demodulating and descrambling the signals received in the antennae 5; a stream separation section 8 for separating the signals received from the satellite broadcast receiving section 6 into respective component signals, i.e., sending image signals to a video-decoder 9 to decode and output as video output, sending audio signals to an audio-decoder 10 and output as audio output, sending system information containing data information such as program schedules and time information to a system bus 20 of the computer 21 via bus control device 11; and a control section 7 for controlling the operations of the bus control section 11, stream separation section 8 and satellite broadcast receiving section 6.

Computer 21 is comprised by: a CPU 14 for managing the overall operation; a memory section 12 for storing programs and data, such as an operating system for operating the computer 21, driver softwares to control various hardware devices, and application softwares to control the operation of satellite signal receiving subsystem 4; a bus control section 13 to control CPU 14, memory 12 and the system bus 20; an I/O control section 15 connected to system bus 20 to control keyboard, hard disc and the like; a battery 17 to memorize the time for the computer 21; a real-time clock circuit 16 powered by the battery 17; a CRT monitor 19 displaying the actions of the computer 21; and a display device 18 connected to the system bus 20 for displaying information on the monitor 19.

The operation of the system will be explained in detail with reference to FIGS. 1,2,3 and 4.

First, the satellite broadcast receiving subsystem 4, connected to the system bus 20 of the computer 21, receives satellite broadcast and sends system information data from the satellite to the computer 21. The satellite broadcast receiving subsystem 4 will be explained in detail. Broadcast transmission facility 1 multiplexes video and audio data of the programs to be broadcast as well as associated system data, such as electronic program guide (EPG), time information and descrambling information, and transmit the signal-multiplexed electrical wave from the satellite broadcast antennae 2 towards the satellite 3. The satellite 3 relays the received electrical wave to the earth, which are received in the satellite broadcast receiving antennae 5.

The satellite broadcast receiving section 6 receives and demodulates the electrical wave of a frequency selected by the control section 7, and the scrambled data are de-scrambled. The data output from the satellite broadcast section 6 are multiplexed, and therefore, using the stream separation section 8, video data are sent to the video-decoder 9 to restore video data to video signals and generate video output while audio data are sent to the audio-decoder to convert to audio signals and generate audio output. Also, the data related to EPG, time information and de-scrambling information are sent through the bus control section 11 to the system bus 20 of the computer 21 to be processed.

Figure 2:
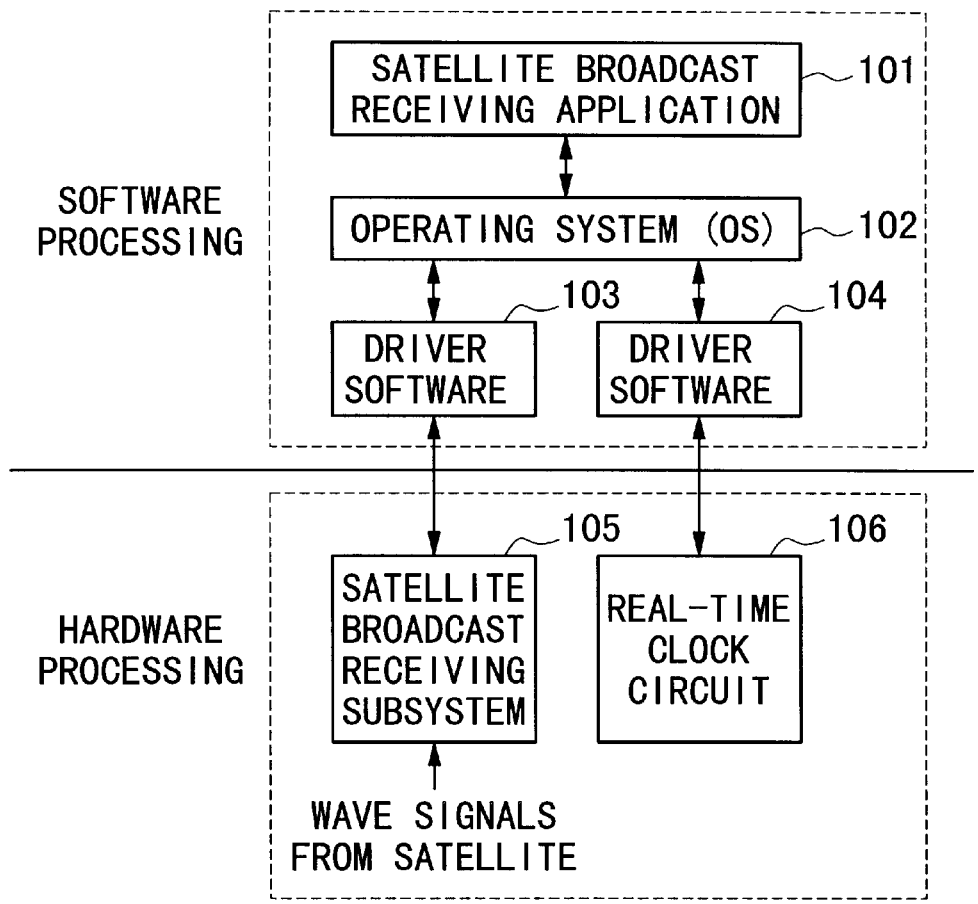
FIG. 2 is a block diagram showing the operation of the device shown in FIG. 1.

Next, processing by the computer 21 will be explained with reference to FIG. 2. Inside the computer 21, the EPG, time information and de-scrambling information received from the satellite broadcast receiving subsystem 105 are processed by application softwares 101 operated by the operating system 102 to execute the driver softwares 103, which acts as the interface there between. The time/date information received from the satellite are arranged in a format shown in FIG. 3 in Japan, and because the time/date information is encoded, the data are decoded to restore the data and are recorded by way of a driver software 104 which controls real-time clock circuit 106.

Figure 4:
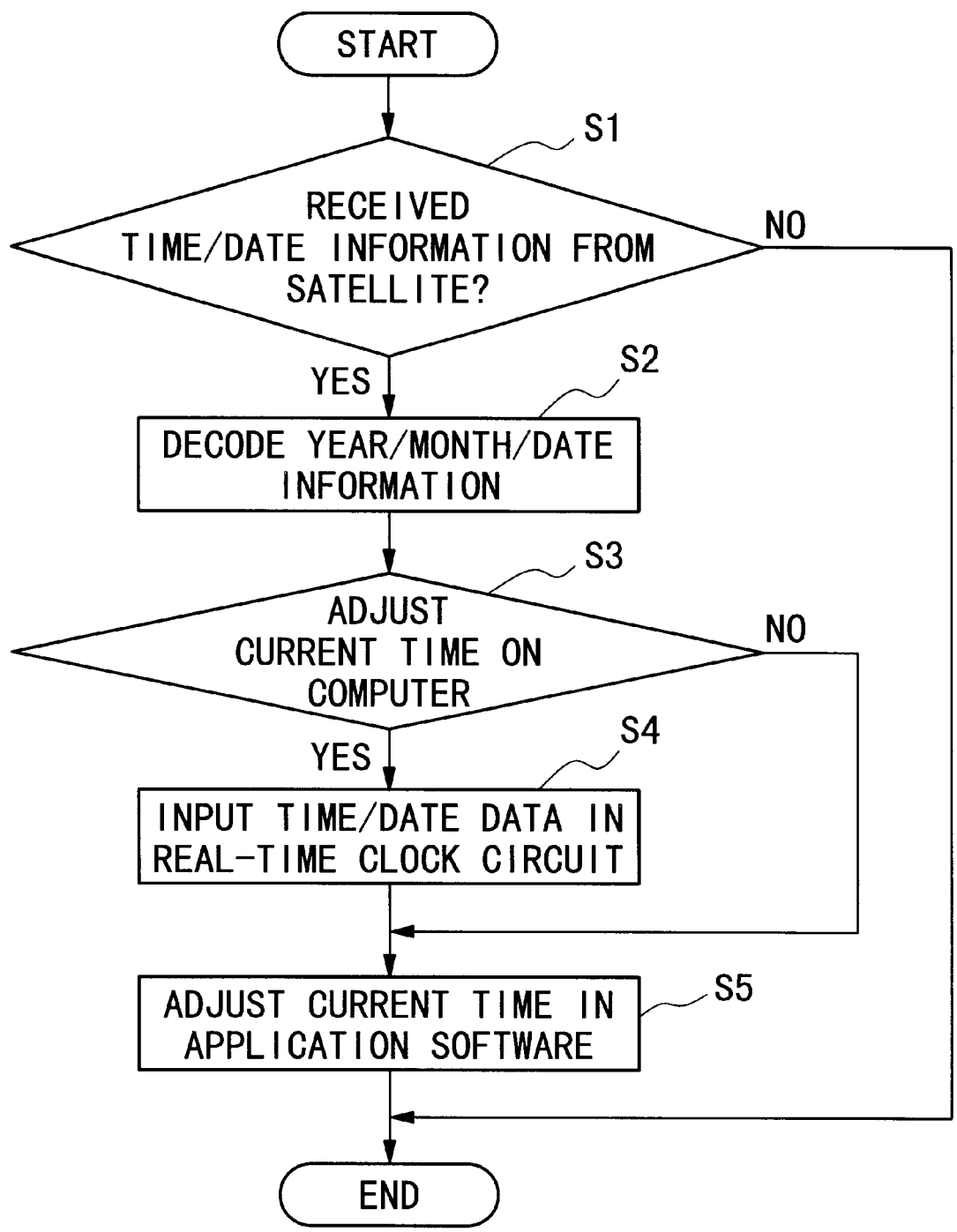
FIG. 4 is a flowchart of the process of time adjustment of the device shown in FIG. 1.

The actions of the application software 101 will be explained with reference to FIG. 4. Initially, it is checked whether a note from the driver software 103 indicating that time/date information from the satellite has been received (S1); if no note, the process is ended without writing to the real-time circuit 106. If a note is received that the time/date information has been received from the satellite, the time/date data are restored (S2), and it is checked whether the computer display time should be changed (S3); if it is not to be changed, the time/date information in the application software 101 is renewed (S5). If the time/date information in the computer 21 is to be adjusted, the time/date information is written in the real-time clock circuit 106 through the driver software 104 (S4), and the time/date information in the application software 101 is renewed (S5). This process synchronizes the time data in the application software 101 and the real-time clock 106 in the computer 21.

In the above embodiment, specific details of broadcasting are as follows. Signals transmitted from the broadcasting facility 1 are transport stream packet signals in MPEG2 (Moving Picture Experts Group) format, and the satellite broadcast antennae 2 and the satellite broadcast receiving antennae 5 are parabolic antennas, and the geostationary satellite 3 may be a digital CS (communication satellite). Also, the satellite broadcast receiving section 6 is a digital CS satellite receiving device, and performs QPSK (Quadrature Phase Shift Keying) demodulation and error correction, and the stream separation section 8 performs separation of transport stream packet signals in MPEG2 format. Further, the system bus 20 is a peripheral component interconnect (PCI) bus, and the computer 21 may be a personal computer.

Figure 3:
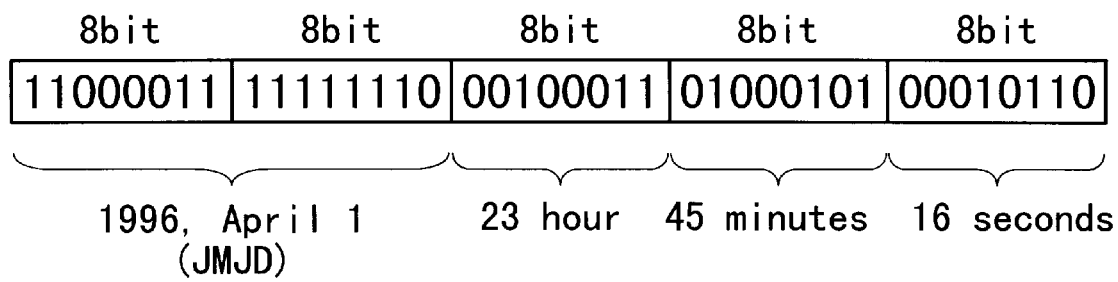
FIG. 3 is an illustration of the format of time/date information in the embodiment shown in FIG. 1.

Computation for restoring the data in JMJD format shown in FIG. 3 to calendar data is performed as follows. Designating a year by Y, a month by M and a day by D, Y'=int ((JMJD−15078.2)/365.25)
M'=int ((JMJD−14956.1−int (Y'×365.25))/30.6001)
D=JMJD−14956−int (Y'×365.25)−int (Y'×365.25)−int (M'×30.6001) where if $14 \leq M' \leq 15$, K=1, but if M' assumes other values, K=0, and
Y=Y'+K and
M=M'−1−K×12.

Figure 5:
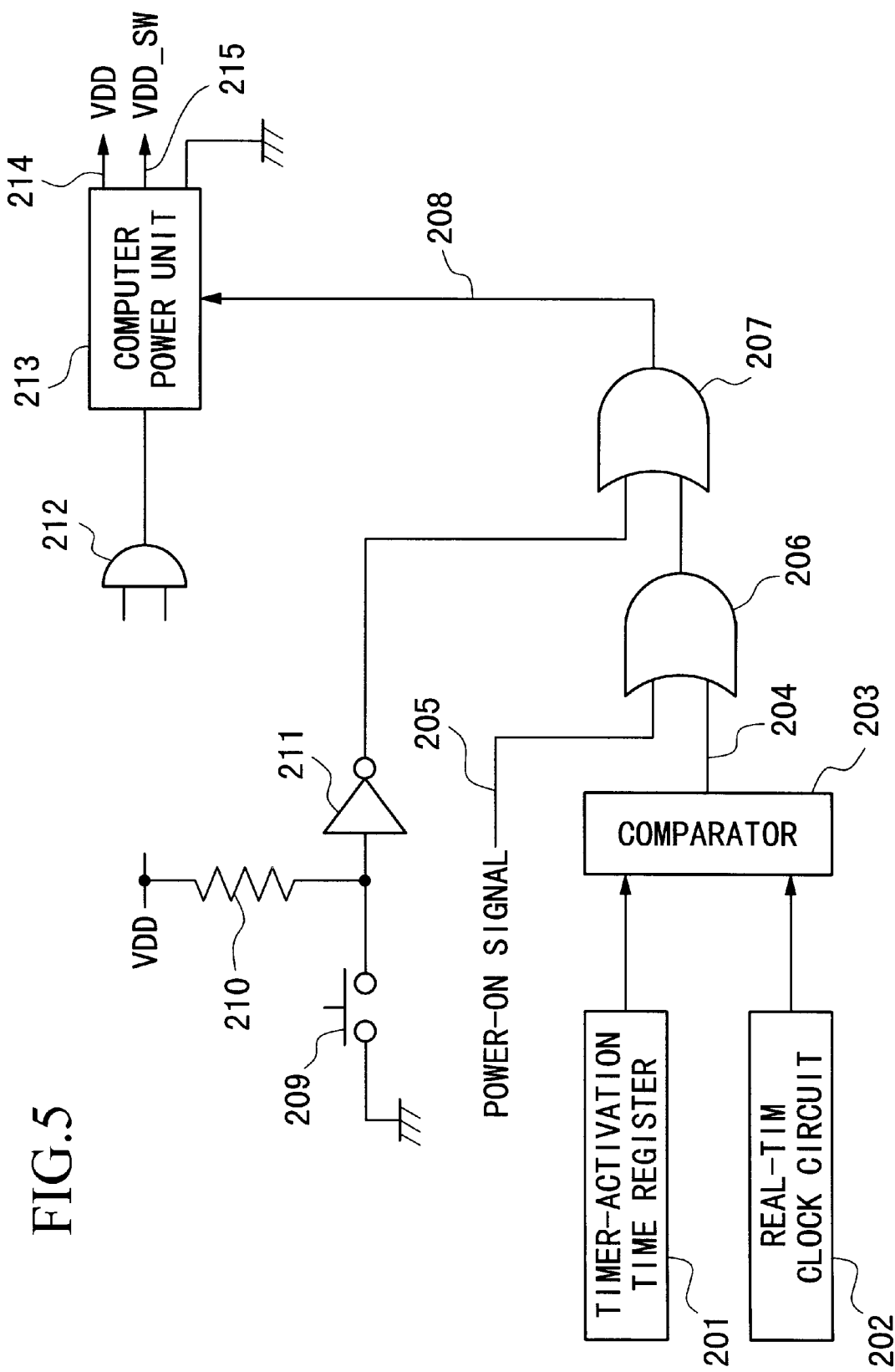
FIG. 5 is a block diagram of another embodiment of the time/date adjustment device.
Figure 6:
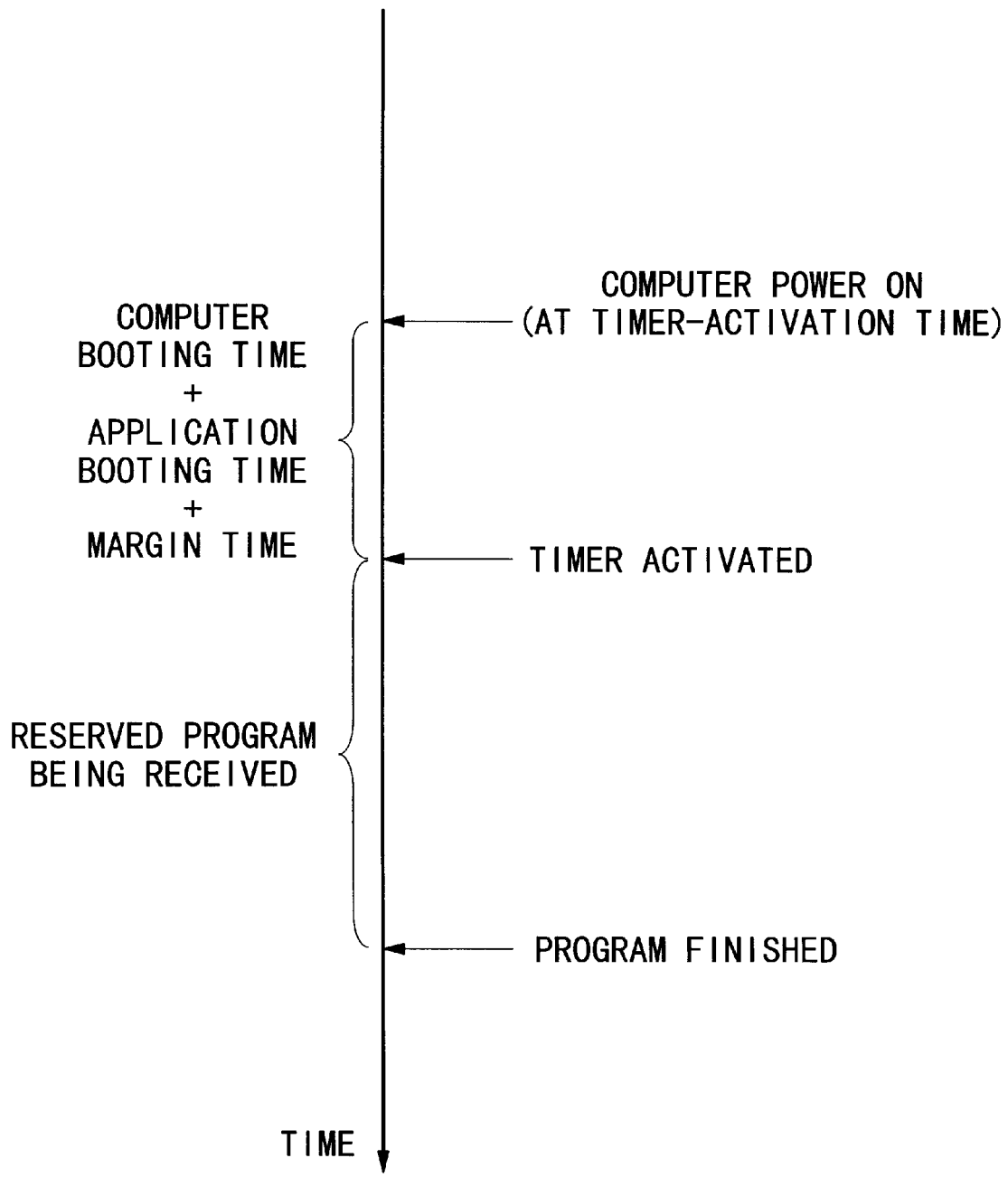
FIG. 6 is a time-chart showing the operational steps of the embodiment shown in FIG. 5.

Next, a second embodiment of the time/date adjustment device will be presented with reference to FIGS. 5 and 6. In this embodiment, time data for activating the timer are input into the timer-activation time register 201 in the computer, and the data are compared with the time/date information in the real-time clock circuit 202. When the time data in the real-time clock circuit 202 exceed the time data in the timer-activation time register 201, a comparator 203 outputs a high-level signal, and if not, a low-level signal is output. The signal 204 output from the comparator 203 and a PowerOn signal 205, which is a high-level signal when the power is on, are input into an OR-gate 206 and a logical sum is obtained. Accordingly, the OR-gate 206 outputs a high-level signal when the computer power is on, and also when the activation time arrives but the computer is in the off-state.

Also, when the power switch 209, having one pole grounded, is turned on manually, a high-level signal is output by inverting with a NOT-gate 211, and when the power switch 209 is in the off-state, a low-level signal is output from the NOT-gate 211 by the pullup resistance 210 connected to the input-side of the NOT-gate 211. The output from NOT-gate 211 and the output from the OR-gate 206 are connected to the input of an OR-gate 207 to obtain a sum, and a power-on request signal 208 is output, which is at high-level when power is requested.

The power unit 213 for the computer 21, in response to the power demand request 208, outputs two types of power from a power source connected to the computer 21 by a plug 212. One type of power is supplied from a steady output power source VDD214, which outputs power constantly without the activation by the power request signal 208. The other type of power is supplied from a power source VDD_SW215 (main power source) which outputs power when requested. Normal computer operations are powered from VDD_SW215 which activates the PowerOn signal 205. The VDD214 is used as the power source for the NOT-gate 211, OR-gate 206, OR-gate 207, the comparator 203 and the timer-activation time register 201. Real-time clock circuit 202 is powered by the battery.

In the second embodiment, when the timer is activated for the first time, the target time data are input by allowing for computing booting time, booting time for satellite broadcast receiving application softwares and some margin of extra time. This method ensures that the computer is completely ready to begin receiving data so that the computer would be totally operational at the desired time.

What is claimed is:

1. A time/date adjustment device for adjusting time/date data of a computer in a computer system, equipped with a satellite broadcast receiving subsystem, comprising:

a time/date receiving section for receiving broadcast time/date information transmitted from a satellite;

a decoding section for decoding said broadcast time/date information;

a write section for writing decoded time/date data to a real-time clock circuit powered by a battery that manages time data in said computer, and a time/date adjuster for determining whether a computer time should be changed, renewing the time/date information in application software if the computer time is not to be changed, and allowing the write section to write the time/date information in the real-time clock circuit while renewing the time/date information in the application software if the time/date information in the computer is to be adjusted.

2. A device according to claim 1, wherein said decoding section is a stream separation device, provided in said satellite broadcast receiving subsystem, for separating time/date data from multiplexed signals, received from said satellite, comprised by video data, audio data and other signals.

3. A device according to one of claim 1, wherein said write section serves as an interface means between satellite broadcast receiving subsystem and an operating system, and is a driver software operated by said computer.

4. A device according to one of claim 1, wherein said computer is provided with: a timer-activation time register for storing time data to enable time-activating said computer even when a main power source for the computer is off;

a comparison section for comparing time/date data in said real-time clock circuit with time data stored in said timer-activation time register, even when said main power source for the computer is off; and a power request section for outputting a power request signal to power said computer based on a comparison result, when said main power source for the computer is not on.

5. A device according to claim 4, wherein said power request section is comprised by:

a first logical sum circuit for performing a logical sum operation of an output result from said comparison section and a power-on signal indicating that said main power source is on; and a second logical sum circuit for performing a logical sum operation of an output result from said first logical sum circuit and an output result of a manual power switch.

6. A device according to claim 4, wherein said time data, input into said timer-activation time register, are derived by adding a computer booting time, an application softwares booting time and a margin time.

7. A method for adjusting time/date data in a computer system, based on time information received from a broadcast satellite, comprising the steps of:

receiving broadcast data from said broadcast satellite in said computer system;

converting time/date information received into time/date data to enable writing to a real-time clock circuit;

writing said time/date data to said real-time clock circuit;

managing time/date information received, including a current time, in a broadcast receiving software executed by a computer and managing said current time in an operating system software for said computer, determining whether a computer time should be changed;

renewing the time/date information in application software if the computer time is not to be changed; and allowing the write section to write the time/date information in the real-time clock circuit while renewing the time/date information in the application software if the time/date information in the computer is to be adjusted.

8. A computer-readable memory containing computer-readable instructions for adjusting time/date data in a computer system, based on time information received from a broadcast satellite, comprising:

means for receiving broadcast data from broadcast satellite in said computer system;

means for converting time/date information received into time/date data to enable writing to a real-time clock circuit;

means for writing said time/date data to said real-time clock circuit;

means for managing time/date information received, including a current time, in a broadcast receiving software executed by a computer and managing said current time in an operating system software for said computer, determining whether a computer time should be changed;

renewing the time/date information in application software if the computer time is not to be changed; and allowing the write section to write the time/date information in the real-time clock circuit while renewing the time/date information in the application software if the time/date information in the computer is to be adjusted.

9. A device according to claim 5, wherein said time data, input into said timer-activation time register, are derived by adding a computer booting time, an application softwares booting time and a margin time.

* * * * *